United States Patent
Sharma

(10) Patent No.: US 6,285,686 B1
(45) Date of Patent: Sep. 4, 2001

(54) USING PAGE REGISTERS FOR EFFICIENT COMMUNICATION

(75) Inventor: Debendra Das Sharma, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/044,659

(22) Filed: Mar. 19, 1998

(51) Int. Cl.$^7$ .................................................. H04J 3/18
(52) U.S. Cl. ............................................................ 370/477
(58) Field of Search .................................. 370/477, 350

(56) References Cited

U.S. PATENT DOCUMENTS

| | | | | |
|---|---|---|---|---|
| 5,020,058 | * | 5/1991 | Holden et al. ...................... | 370/477 |
| 5,146,456 | * | 9/1992 | Berkovich ............................ | 370/477 |
| 5,317,604 | * | 5/1994 | Osterweil ............................. | 370/477 |
| 5,440,562 | * | 8/1995 | Cutler, Jr. ............................ | 370/350 |
| 5,691,986 | * | 11/1997 | Pearlstein ............................ | 370/477 |
| 5,831,872 | * | 11/1998 | Pan et al. ............................. | 370/477 |
| 5,886,995 | * | 5/1999 | Arsenault et al. ................... | 370/477 |
| 6,038,231 | * | 3/2000 | Dolby et al. ......................... | 370/477 |

* cited by examiner

*Primary Examiner*—Salvatore Cangialosi

(57) ABSTRACT

The inventive mechanism reduces the bandwidth required to transmit an information packet. The inventive mechanism uses page registers that store the bit patterns that are likely to repeat. The information includes a reference to the stored pattern in place of the pattern. Both the receiving node and the sending node store the pattern. A sender would review its page registers to determine if the bit pattern which it is about to send is already present. If it exists, it sends the page register number instead of the bit pattern. The resultant reduction in packet length increases the usable bandwidth. If the entry does not exist in the page registers, and the bit pattern is likely to repeat in the fixed bit positions, the sender may store the bits in a particular page register and send the packet with all the bits, and include a format that tells the receiver to store the repeated bits in the same page register number where the sender stored the bits. Subsequent transactions with the same bit patterns will benefit from the page register usage.

50 Claims, 2 Drawing Sheets

USING PAGE REGISTERS FOR EFFICIENT COMMUNICATION

BACKGROUND OF THE INVENTION

In an interconnected computer network, the devices communicate through transactions. A transaction comprises one or more packets and conveys some meaningful information. For example, a CPU in a multiprocessor network may respond to a snoop request with a "snoop response" transaction. Generally, a packet consists of a fixed number of transfers or cycles in the interconnect structure. Different transactions may require different number of packets. A transaction may comprise one or more packets forming the header, followed by zero or more packets forming the accompanying data. The header packet(s) may comprise information such as the source node identifier, the destination node identifier, the address bits, the transaction identifier, length of the transaction, flow-control information. Note that different terms are sometimes used but have the same meaning, for example, it is common to use the terms address cycle and data cycle for the header packet and the data packet, respectively.

The raw bandwidth of an interconnect structure is determined by the number of wires and the frequency at which data is transferred. For example, the raw bandwidth available in a 39-bit wide bus, operating at 100 MHz, is 3900 Mbits/sec. The usable bandwidth would be less due to ECC and header packet overheads. The usable bandwidth will depend on the efficiency of the underlying protocol.

The prior art approach to improving the bandwidth relies on expanding the interconnect width and/or increasing the frequency of operation. This approach yields better bandwidth via wider interconnect andp/or faster data transfer. Thus, the improvement in usable bandwidth is solely due to the improvement in the raw bandwidth. The ratio of the usable bandwidth to the raw bandwidth remains unchanged. However, increasing the raw bandwidth is expensive in terms of manufacturing costs. Moreover, the increase in raw bandwidth may lead to electrical problems in the system interconnect interface. Note that technological limitations will restrict the amount with which the raw bandwidth can be increased.

Encoding schemes such as Hoffman encoding may be able to achieve more bandwidth by encoding the most frequently occurring patterns with less number of bits. However, Hoffman encoding require that these bit patterns be known before their actual use, so that the most used bit patterns are assigned the smallest number of bits. For example, assume that a system uses 4 bits in a pattern, and 1111 is the most common pattern. Using Hoffman coding, this pattern will be assigned 0. The next most common pattern will be assigned 10, the next will be assigned 110, then 1110, etc. Thus, Hoffman coding uses variable lengths of bit patterns to indicate the same width of data transfer. Note that some bit patterns are represented by a single bit and others, particularly, the least used patterns will be represented by more than 4 bits.

In typical systems, it is not possible to identify patterns that are more likely to occur than others, because computer systems exhibit a locality of reference that changes over time with regards to addresses and data patterns. Thus, in a computer system one may not be able to predict which addresses are more likely to be accessed than others, since this depends on the application, and space the address patterns change as the program executes. In other words, if a particular page or address is accessed, then most likely a nearby address will be accessed next. Hoffman codes are static and cannot change over time. Moreover, Hoffman encoding requires more bits for the patterns that are "less likely", as a result one may end up in degraded performance.

Therefore, there is a need in the art for a mechanism which will improve the ratio of usable bandwidth to the raw bandwidth and thereby increase the bandwidth without having to increase the frequency or the number of wires.

SUMMARY OF THE INVENTION

These and other objects, features and technical advantages are achieved by a system and method which increases the usable data bandwidth by improving the efficiency of the protocol through the use of page registers as pointers. The inventive mechanism tracks bit patterns that could potentially repeat in page registers. If a bit pattern exists in a page register, then the page register number is sent to the receiver instead of the bit pattern. This conveys the same amount of information with less number of bits and hence improves the usable bandwidth.

In particular, the higher order address bits tend to repeat in sequential transactions, since computer programs exhibit locality of reference. Thus, by storing the higher order address bits in page registers, a pointer is sent to the destination node, which instructs it to look up the higher order bits in its page register, rather than send all the address bits. The inventive mechanism enhances the performance by providing the flexibility of choosing 'on-the-fly' which bit patterns are likely to repeat and overwriting older patterns as time progresses. Note that the inventive mechanism does not degrade the performance for bit patterns that do not repeat. Further note that the inventive mechanism is not limited only to address bits, but can be used for any other fields that repeat. The invention is useful in systems where there is a notion of a start and end of a transfer.

It is a technical advantage of the invention to increase the useable bandwidth of a computer network system without having to increase with raw bandwidth.

It is another technical advantage of the invention to store the repeated bit patterns in page registers, which allows a smaller sized reference to the register to be sent to the destination node instead of the larger sized bit pattern.

It is a further technical advantage of the invention to store repeated address bit patterns in the page registers.

It is a further technical advantage of the invention to change the stored patterns over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
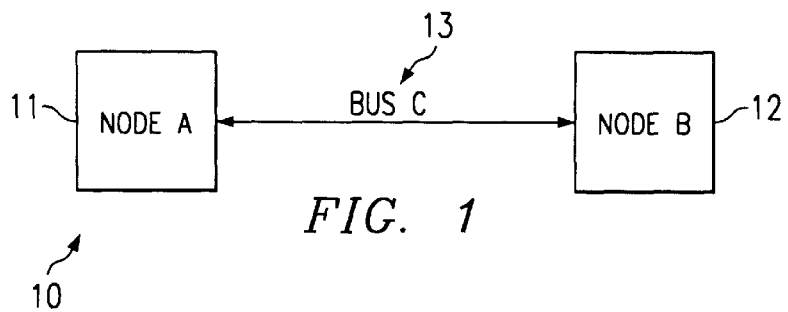
FIG. 1 depicts a network system having two nodes interconnected by a bus.

FIG. 1 depicts a simple network system 10, having two nodes, node A11 and node B12 connected by bus 13. For purposes of discussion assume that the bus C13 is 39 bits wide, with a frequency of approximately 100 MHz. Thus, the overall bandwidth of system 10 is 3900 Mbits/sec. Also assuming that ECC is used, such that out of the 39 bits, 32 bits are information, and 7 bits are ECC check bits that form a (39, 32) single error correcting, double error detecting (SEC-DED) ECC code. The address bits are assumed to be 32 bits wide, broken into 16 upper address bits and 16 lower address bits. The system 10 uses a packet type of communications, however other communication types may be used.

TABLE 1

Two Packet Header

| Field Name | Width (bit positions) |
|---|---|
| Packet 1 | |
| Source Node | 3 (2:0) |
| Destination Node | 3 (5:3) |
| Transaction type | 4 (9:6) |
| Upper Address bits | 16 (25:10) |
| Spare | 6 (31:26) |
| Packet 2 | |
| Lower Address bits | 16 (15:0) |
| Spare | 16 (31:16) |

Table 1 shows an example of the contents of the header packets for a transaction, which is being sent from node A11 to node B12 via bus C13. The transaction requires 2 cycles, or 2 packets, to send all of the necessary header information. The data will follow in zero or more data packets. Other types of transactions may require different number of cycles. The header packet as well as its contents are shown by way of example only.

The first packet of Table 1, comprises 3 bits to identify the source node of the packet, 3 bits to identify the destination node of the packet, 4 bits to identify the particular transaction, and 16 upper address bits. The 6 remaining bits of the 32 available bits are insufficient to carry the lower 16 address bit. Thus, the 16 lower address bits are sent in the second packet. Therefore, the transaction will require two packets or two cycles to send the header information. If this requirement were to be cut to one packet or one cycle, then the effective bandwidth will be increased as more cycles will be available to carry data packets.

Note that a subsequent header packet is likely to have a similar address, particularly a similar upper address, since nodes tend to exhibit locality of reference as far as their accesses are concerned. Thus, the inventive mechanism uses page registers that store the bit patterns that are likely to repeat. To accomplish this, the definition of the header packet includes the format information as well as the page register information. The sender node and the receiver node have a fixed number of page registers to store the bits in the fixed bit positions that have the potential of repetition. A sender would review its page registers to determine if the bit pattern which it is about to send is already present. If it exists, than it sends the page register number (where it found the matching bit pattern) along with the proper format without sending the bit pattern. The resultant reduction in header length increases the usable bandwidth. If the entry does not exist in the page registers, and the bit pattern is likely to repeat in the fixed bit positions, the sender may store the bits in a particular page register and send the header with all the bits, but with a format that tells the receiver to store the repeated bits in a page register of the same number where the sender stored the bits. Subsequent transactions with the same bit patterns will benefit from the page register usage.

TABLE 2

Two Packet Header

| Field Name | Width (bit positions) |
|---|---|
| Packet 1 | |
| Format | 2 (1:0) |
| Page Register Number | 4 (5:2) |
| Source Node | 3 (8:6) |
| Destination Node | 3 (11:9) |
| Transaction type | 4 (15:12) |
| Upper Address bits | 16 (31:16) |
| Packet 2 | |
| Lower Address bits | 16 (15:0) |
| Spare | 16 (31:6) |

TABLE 3

One Packet Header

| Field Name | Width (bit positions) |
|---|---|
| Packet 1 | |
| Format | 2 (1:0) |
| Page Register Number | 4 (5:2) |
| Source Node | 3 (8:6) |
| Destination Node | 3 (11:9) |
| Transaction type | 4 (15:12) |
| Lower Address bits | 16 (31:16) |

Table 2 depicts the header packets for the same transaction as shown in Table 1, but includes format and page register number bits in place of the spare bits. The format bits inform the destination or receiving node as to the type of packet, i.e. whether there are two header packets as shown in Table 2, or whether there is only one header packet as shown in Table 3. The two format bits allow for a total of four formats. For example, 00 indicates that the header is 2 packets long or full length, and instructs the destination node not to store the upper address bits in any page register, as it is not anticipated to be repeated. A format of 01 implies that the current packet is part of two packet header, but the higher address bits need to be stored in the page register indicated by the page register number bits, as it is anticipated to be repeated. Thus, subsequent transactions may send a lesser number of header packets if the higher address bits match. Format 11 indicates that the sender is only one header packet, as shown in Table 3, which does not include the upper address bits. Thus, the receiving node will retrieve the upper 16 address bits by looking up the page register indicated by the sending node in the packet. The actual format bits are by way of example only, as a different format arrangement could be used, for example 11 may indicate that the header is 2 packets long or full length, and the destination node should not store the upper address in any page register. More bits are required if more than four formats are to be used. Note that the sending node commands the receiving node. The sending node determines what steps the receiving node should take, e.g. whether to store the upper address bits, and instructs the receiving node with the format bits.

The page register number bits identify the particular register which is to be accessed by the receiving node. The four bits allow for a total of 16 page registers to be involved with the sender node and the receiving node. Thus, node A11 (as well as node B12) would have 16 page registers in its sending interface for node B12. To reciprocate, node B12 should have 16 page registers in the receiving interface for node A11. It should be noted that a node may have more than one set of page registers in its sending interface either for one or multiple destination nodes. Since there are 16 upper address bits, each register would be 16 bits wide. Note that if the address is a different size, then the register would also be of the same width. Additional sets of registers would be required for connection with different nodes. For example, an additional set of 16 registers may be required in the sending interface of node A11 for an additional connection between node A11 and node Q (not shown).

For example, suppose an address is being sent from the sending node with the upper order address bits 0x01A1 (in hex) and lower order address bits 0x1BC1. Before the sending node A11 sends the packet to node B12, the sending node reviews its own page registers to determine if the upper order address bits have already been sent. Assuming these bits do not exist in the page registers, the sending node then decides whether the upper address bits are likely to repeat based on some internal hints. If it decides that this address is a likely pattern, it selects a page register to store the address bits, based on an internal page register replacement mechanism. Suppose register 7 is selected, then sending node sends the two packet header of Table 1 with the format set to 01 and page register number=7. The receiving node B12 on receipt of this packet, stores 0x01A1 in its own page register number 7, as indicated by the format 01 and the page register number 7 that it received in the first packet of the header. Suppose a subsequent transaction from node A11 to node B12 is to address 0x01A1_11BC, then the upper order address bits will be found in page register 7 by the sending node. Thus, the sending node can send the header in the one packet format shown in Table 3 with format=11 and page register number=7. The receiving node B12 will then look up page register number 7 and obtain the upper address bits as 0x01A1. Thus, the bandwidth required to send the second packet is saved in this transaction.

The sending node decides which addresses to save based upon hints in the usage of the address. For example, assume the sending node is an I/O chip, and is moving an entire page out of memory, which will require multiple transactions. Thus, the I/O chip will know that a similar memory location will be sequentially accessed, particularly the upper address bits. The I/O chip will send a hint bit to the page register logic to save the current address, and instruct the receiving node to do likewise via the format bits. Alternatively, each address could be stored in a register, and older addresses would be bumped out by newer addresses. Other mechanisms for managing the page registers could be used.

Figure 2A:
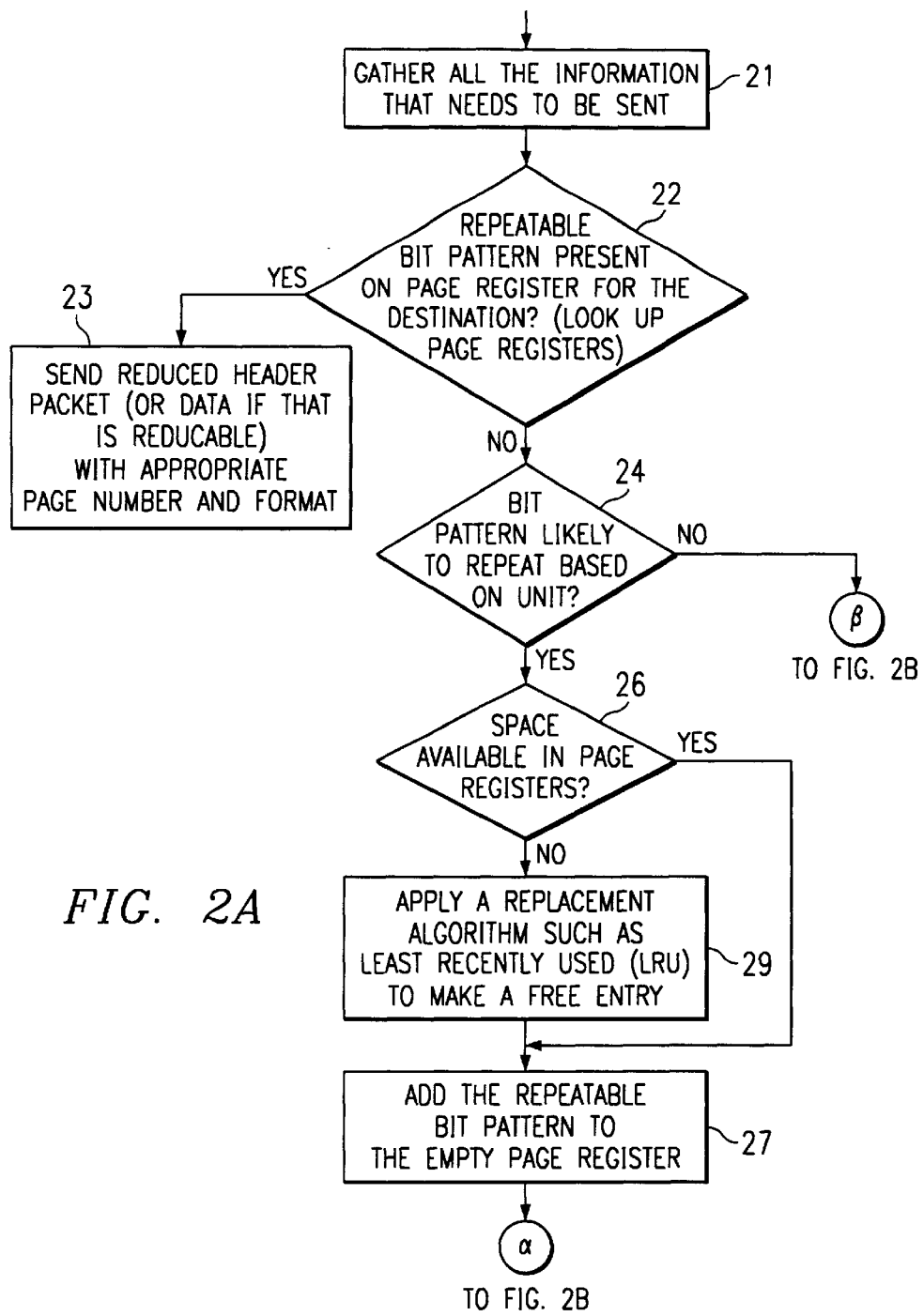
FIGS. 2A and 2B depict a flow diagram of the inventive mechanism resident in a sending node.
Figure 2B:
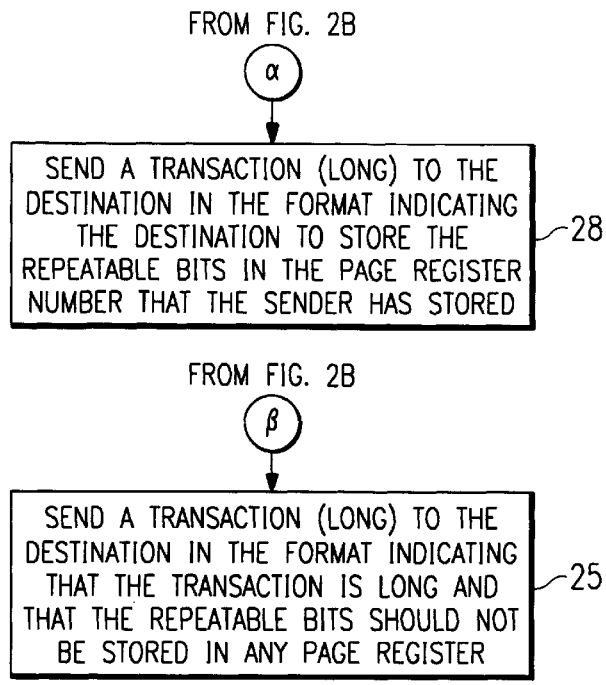

FIGS. 2A and 2B depict the portion of the inventive mechanism resident in the sending node. The sending node first gathers all the information that needs to be sent 21. This information comprises the addresses, flow control information, transaction type, data, etc. Then the sending node determines whether the address pattern is a repeat pattern that is already stored in the page registers 22. The sending node compares the current upper address bits with those stored in the registers. If it finds a match, then the sending node sends a reduced header packet as shown in Table 3 with the appropriate page number and format number 23. Note that the savings in bit patterns need not be restricted to address bits only—one may choose some other field also. One may also choose multiple fields which will involve multiple format fields, multiple page register sets and multiple page number fields; one corresponding to each field that is being optimized. The packet will be sent to the receiving node, processed through ECC, and appropriately handled by node B.

If the sending node does not find a match between the current upper address bits and those stored within its page registers, then the sending node decides whether the bit pattern is likely to be repeated 24. If the pattern is not likely to be repeated, then the sending node will send a full 2 packet header as shown in Table 2 to the receiving node, that also instructs the receiving node not to save the address bits 25. If the pattern is likely to be repeated, then the sending node determines whether there is space in the page registers for the pattern 26. If space is available, then the sending node adds the pattern to its page registers 27, and sends a full 2 packet header as shown in Table 2 to the receiving node which instructs the receiving node to save the address bits 28 in the specified page register. If space is not available, then a replacement algorithm such as the least recently used scheme may be employed to make room in the page registers for the new address entry 29, before adding the pattern to the registers 27.

Figure 3:
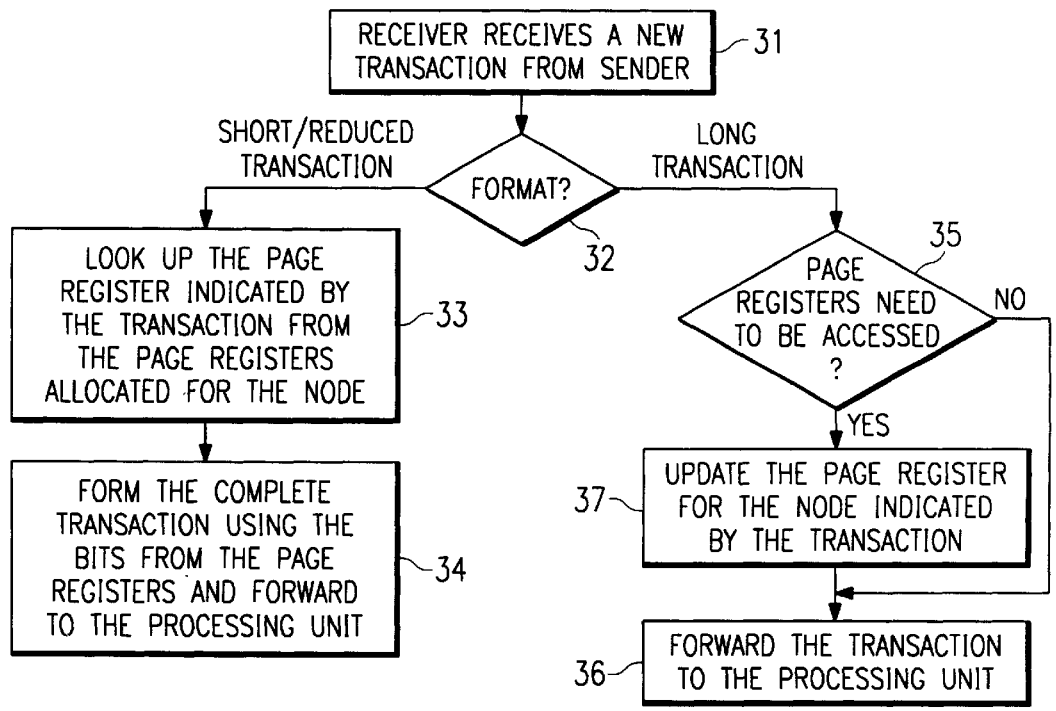
FIG. 3 depicts a flow diagram of the inventive mechanism resident in a receiving node.

FIG. 3 depicts the portion of the inventive mechanism resident in the receiving node. The receiving node receives a new transaction packet from the sending node 31. The receiving node then determines the format of the packet from the format bits 32, i.e. a reduced packet or a long packet. If the packet is a reduced packet, then the receiving node retrieves the upper address portion from its own page registers, as indicated by the page number bits in the packet 33. The receiving node then constructs the complete address from the data in packet and the page register, and processes the transaction in the appropriate manner 34.

If the packet is a long packet, then the receiving node determines whether the upper address portion must be saved in its page registers, as indicated by the format bits in the packet. If it does not have to save the address, then the receiving node passes on the packet for appropriate processing 36. If the receiving node is instructed to save the address bits, then the receiving node updates the specified page register with the new address 37 before processing the packet 36.

Note that the page registers can be used to store other types of patterns other than upper address bits. They can store data patterns, patterns in a single packet fields, patterns in multiple fields, or full address patterns. Note that the bit positions in the packets do not have to be fixed bit positions, multiple sets of bit positions could be used independently and simultaneously by having multiple sets of page registers.

Further note that separate page registers must exist between every pair of sender and receiver nodes. However, every pair of nodes in the system do not have to use the inventive mechanism, and thus those nodes do not need registers. Note that the inventive mechanism will operate on systems that are not bus based. Any interconnect structure will work, so long as packets will arrive in the order in which they were sent or belong to classes of packets which will arrive in the order in which they were sent. Further, the selected bits need not be clubbed together, as shown in the tables. Different sets of selected bits can be stored independently in their own sets of page registers. In this case, each set of selected bits will need format and page register fields.

Note that instead of sending the lower address bits in the reduced packet, a bit sequence can be sent indicating a difference from the stored address value. Thus, a + or − value is sent which would be applied to the stored address to determine the new address. However, for this embodiment, the entire address must be stored, instead of just the upper address portion.

Therefore, the inventive mechanism improves the effective bandwidth between communicating nodes by sending fewer number of header address bits and using the page registers. The inventive mechanism improves the bandwidth without having to increase the frequency and/or the width of the interconnect media.

Although the present invention and its advantages have been described in detail, it should be understood that various changes, substitutions and alterations can be made herein without departing from the spirit and scope of the invention as defined by the appended claims.

What is claimed is:

1. A sending node that sends an information packet to a receiving node, the sending node comprising:
   means for dynamically deciding whether at least one bit pattern in the information packet is to repeat in a subsequent information packet;
   means for storing the one bit pattern if the means for dynamically deciding has determined that the one bit pattern is to repeat; and
   means for referencing a location of the stored one bit pattern in the information packet in place of the one bit pattern.

2. The sending node of claim 1, wherein:
   the means for referencing reduces the bandwidth requirement for sending the information packet.

3. The sending node of claim 1, further comprising:
   means for constructing the information packet.

4. The sending node of claim 1, further comprising:
   means for determining whether at least one bit pattern has been previously stored, which operates prior to the means for dynamically deciding.

5. The sending node of claim 4, wherein:
   if the one bit pattern has been previously stored, then the information packet references the location of the previously stored one bit pattern.

6. The sending node of claim 1, further comprising:
   means for determining whether space exists for storing the one bit pattern.

7. The sending node of claim 6, wherein:
   if there is insufficient space for storing the one bit pattern, then a replacement mechanism is used to make space to store the one bit pattern.

8. The sending node of claim 7, wherein:
   wherein the replacement mechanism removes the least recently used entry.

9. The sending node of claim 1, wherein:
   the bit pattern is a portion of an address.

10. The sending node of claim 1, wherein:
    the packet exhibits repeatable patterns.

11. The sending node of claim 1, wherein:
    the packet is a data packet.

12. A method for sending an information packet from a sending node to a receiving node, the method comprising the steps of:
    dynamically deciding whether at least one bit pattern in the information packet is to repeat in a subsequent information packet;
    storing the one bit pattern if the one bit pattern is to repeat; and
    referencing a location of the stored one bit pattern in the information packet in place of the one bit pattern.

13. The method of claim 12, wherein:
    the step of referencing reduces the bandwidth requirement for sending the information packet.

14. The method of claim 12, further comprising the step of:
    constructing the information packet.

15. The method of claim 12, further comprising the step of:
    determining, prior to the step of dynamically deciding, whether at least one bit pattern has been previously stored.

16. The method of claim 15, wherein:
    if the one bit pattern has been previously stored, then the step of referencing references the location of the previously stored one bit pattern.

17. The method of claim 12, further comprising the step of:
    determining whether space exists for storing the one bit pattern.

18. The method of claim 17, further comprising the step of:
    using a replacement mechanism to make space if there is insufficient space for storing the one bit pattern.

19. The method of claim 18, wherein:
    wherein the replacement mechanism removes the least recently used entry.

20. The method of claim 12, wherein:
    the bit pattern is a portion of an address.

21. The method of claim 12, wherein:
    the packet is a header packet.

22. The method of claim 12, wherein:
    the packet is a data packet.

23. A receiving node that receives an information packet from a sending node, the receiving node comprising:
    means for storing a particular bit pattern in the information packet for use with a subsequent information packet that is controlled by bits in the information packet; and
    means for retrieving a stored bit pattern from a previous information packet for use with the information packet that is controlled by bits in the information packet.

24. The receiving node of claim 23, wherein:
    the bits in the information packet are constructed by the sending node.

25. The receiving node of claim 24, wherein:
    the bits in the information packet instruct the receiving node whether to store the particular bit pattern.

26. The receiving node of claim 25, wherein:
    the bits include a particular location for storing the particular bit pattern.

27. The receiving node of claim 24, wherein:

the bits in the information packet instruct the receiving node whether to retrieve the stored bit pattern.

28. The receiving node of claim 27, wherein:

the bits include a particular location for retrieving the stored bit pattern.

29. The receiving node of claim 23, wherein:

the means for retrieving reduces the bandwidth requirement for sending the information packet.

30. The receiving node of claim 23, further comprising:

means for forming a complete transaction using information from the information packet and the stored bit pattern.

31. The receiving node of claim 23, further comprising:

means for processing the information packet.

32. The receiving node of claim 23, wherein:

the bit pattern is a portion of an address.

33. The receiving node of claim 23, wherein:

the packet is a header packet.

34. The receiving node of claim 23, wherein:

the packet is a data packet.

35. A method for receiving an information packet from a sending node to a receiving node, the method comprising the steps of:

storing a particular bit pattern in the information packet for use with a subsequent information packet, controlled by bits in the information packet; and retrieving a stored bit pattern from a previous information packet for use with the information packet, controlled by bits in the information packet.

36. The method of claim 35, wherein:

the bits in the information packet are constructed by the sending node.

37. The method of claim 36, wherein:

the bits in the information packet instruct the receiving node whether to store the particular bit pattern.

38. The method of claim 37, wherein:

the bits include a particular location for storing the particular bit pattern.

39. The method of claim 36, wherein:

the bits in the information packet instruct the receiving node whether to retrieve the stored bit pattern.

40. The method of claim 39, wherein:

the bits include a particular location for retrieving the stored bit pattern.

41. The method of claim 35, wherein:

the step of retrieving reduces the bandwidth requirement for sending the information packet.

42. The method of claim 35, further comprising the step of:

forming a complete transaction using information from the information packet and the stored bit pattern.

43. The method of claim 35, further comprising the step of:

processing the information packet.

44. The method of claim 35, wherein:

the bit pattern is a portion of an address.

45. The method of claim 35, wherein:

the packet is a header packet.

46. The method of claim 35, wherein:

the packet is a data packet.

47. An information packet that is transmitted from a sending node to a receiving node, the information packet comprising:

format bits which instruct the receiving node as to whether to store a particular bit pattern in the information packet for use with a subsequent information packet, and whether to retrieve a stored bit pattern from a previous information packet for use with the information packet; and register bits which point to a location for one of the particular bit pattern and the stored bit pattern based upon the format bits.

48. The information packet of claim 47, wherein:

the bit pattern is a repeatable bit pattern in a portion of an address.

49. The information packet of claim 47, wherein:

the packet is a header packet.

50. The information packet of claim 47, wherein:

the packet is a data packet.

* * * * *